United States Patent
Gahan et al.

(10) Patent No.: US 6,804,804 B2
(45) Date of Patent: Oct. 12, 2004

(54) CALCULATION AND TRANSMISSION OF ERROR CHECK CODES

(75) Inventors: Richard A Gahan, Gory (IE); Eugene O'Neill, Dublin (IE)

(73) Assignee: 3Com Corporation, Santa Clara, CA (US)

( * ) Notice: Subject to any disclaimer, the term of this patent is extended or adjusted under 35 U.S.C. 154(b) by 445 days.

(21) Appl. No.: 09/909,756

(22) Filed: Jul. 23, 2001

(65) Prior Publication Data

US 2002/0120899 A1 Aug. 29, 2002

(30) Foreign Application Priority Data

Feb. 27, 2001 (GB) .............................................. 0104837

(51) Int. Cl.[7] .................................................. G08C 25/02
(52) U.S. Cl. ........................................................ 714/748
(58) Field of Search ................................ 714/748, 746

(56) References Cited

U.S. PATENT DOCUMENTS

| 4,410,989 | A | | 10/1983 | Berlekamp | 714/763 |
|---|---|---|---|---|---|
| 5,007,055 | A | * | 4/1991 | Isono et al. | 714/748 |
| 5,280,488 | A | | 1/1994 | Glover et al. | 714/752 |
| 5,357,525 | A | * | 10/1994 | Moriue et al. | 714/748 |
| 5,465,261 | A | | 11/1995 | Dreschene | 714/762 |
| 5,701,316 | A | * | 12/1997 | Alferness et al. | 714/807 |
| 5,815,516 | A | * | 9/1998 | Aaker et al. | 714/807 |
| 6,173,333 | B1 | * | 1/2001 | Jolitz et al. | 709/240 |
| 6,412,092 | B1 | * | 6/2002 | Raghunath | 714/807 |
| 6,625,241 | B2 | * | 9/2003 | Mejia | 375/372 |

FOREIGN PATENT DOCUMENTS

WO    WO 89/02123    3/1989    ........... G06F/11/00

* cited by examiner

*Primary Examiner*—Albert Decady
*Assistant Examiner*—Esaw Abraham
(74) *Attorney, Agent, or Firm*—Nixon & Vanderhye P.C.

(57) ABSTRACT

A method of transmitting data (1) generated in an upper layer protocol such as iSCSI in a transport protocol such as TCP or SCTP, without requiring separate reads for check code generation and transmission. The upper layer protocol data is read into a transmission engine (5) that calculates the error check codes and inserts them into the transport protocol transmission. To prevent having to recalculate error codes in the event of loss of transmitted data and a retransmission request, the engine preferably also writes the error check codes into the memory so that the can be retrieved if retransmission is necessary.

20 Claims, 4 Drawing Sheets

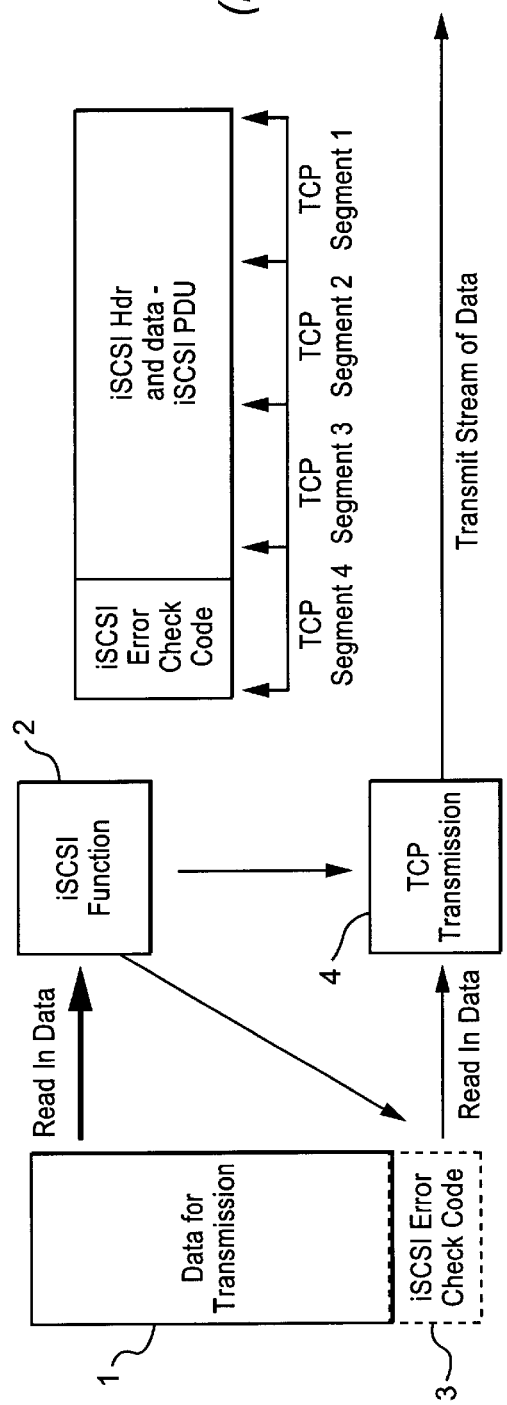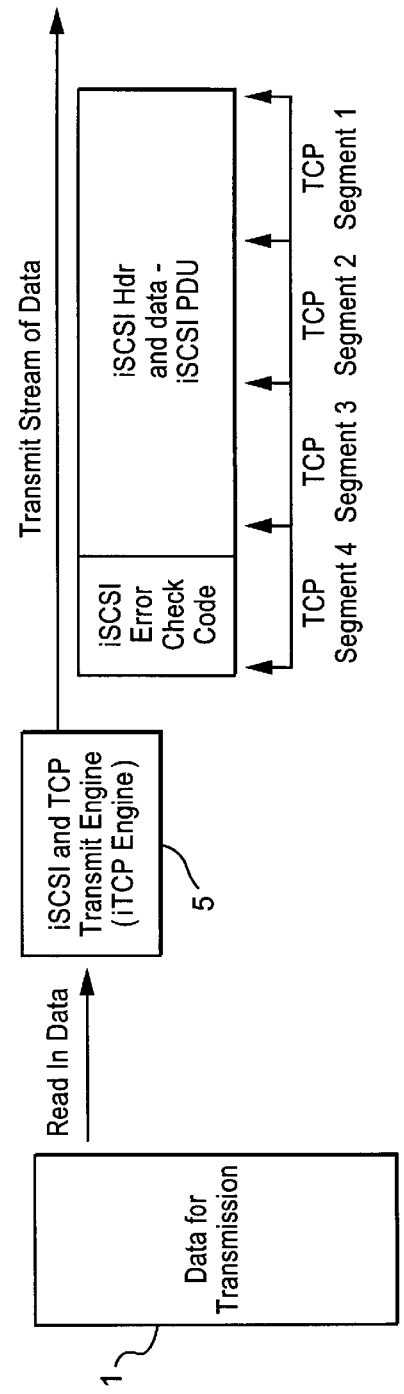

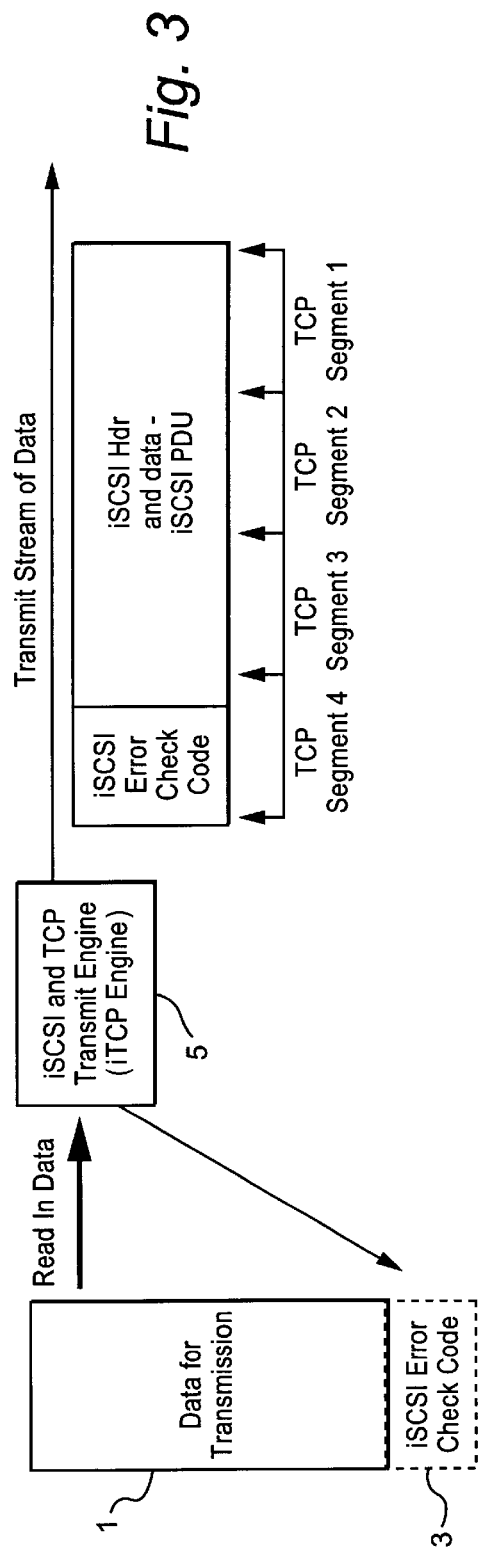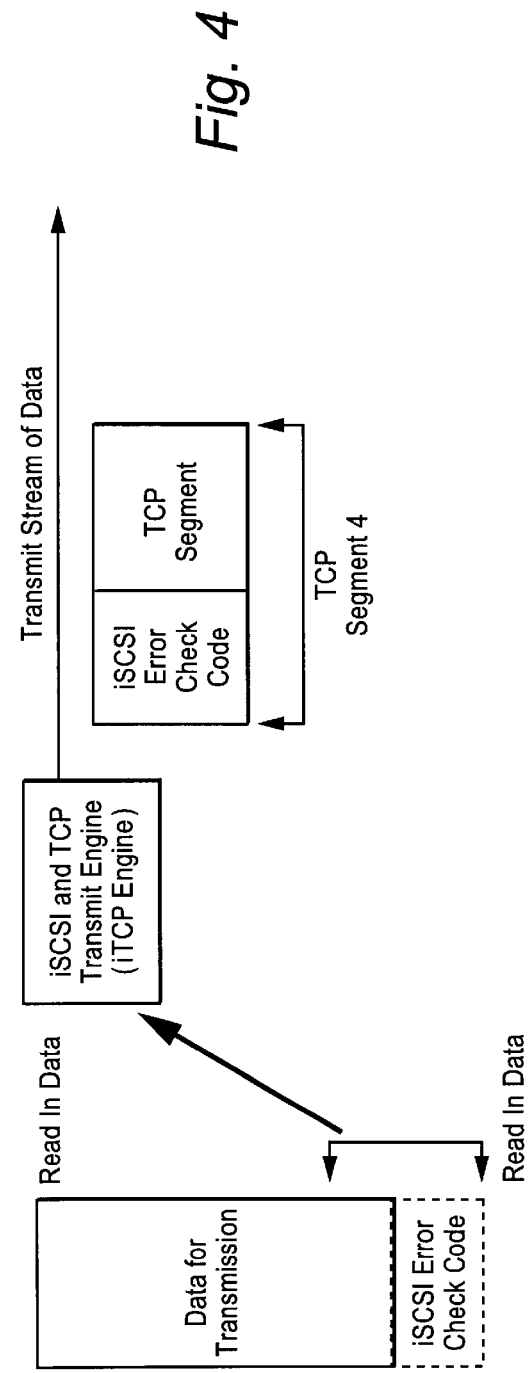

iTCP Function

CALCULATION AND TRANSMISSION OF ERROR CHECK CODES

FIELD OF THE INVENTION

This invention relates to transport protocol transmission of data generated in a higher level protocol, including calculation and transmission of error check codes with only a single read process. The transport protocol may be any suitable protocol such as TCP, SCTP or other transport layer protocol.

BACKGROUND OF THE INVENTION

When data streams such as iSCSI protocol are to be transmitted the are put into a transport protocol such as TCP (transmission control packet) PDUs (protocol data units) for transmission. These are often also called segments. The current method of generating and transmitting error check codes for iSCSI data in a TCP data stream involves reading the iSCSI data from memory into a functional block that calculates the iSCSI error check codes, which are then written back to the memory. Then a TCP functional unit reads the data and check codes from the memory for transmission. The problem with this is that it involves two read stages for each transmission.

SUMMARY OF THE INVENTION

The present invention is directed towards providing transport protocol transmission with only a single read procedure.

Accordingly the invention provides a method of transmitting data generated in an upper layer protocol in transport protocol data units that include error check codes and which requires only a single read from memory the method comprising reading the data from memory, generating error check codes, generating and transmitting one or more transport protocol data units making up data units of the upper layer protocol and inserting the error check codes into the transport protocol transmission.

BRIEF DESCRIPTION OF THE DRAWINGS

The invention is described by way of example with reference to the following drawings in which FIG. 1 is a schematic diagram of a prior art system for TCP transmission.

FIG. 2 is a schematic diagram of a single read transmission as utilised in the invention:

FIG. 3 is a schematic diagram of a preferred embodiment of the invention with a single read transmission and error code write back.

FIG. 4 is a schematic diagram of the embodiment of FIG. 3 illustrating a partial retransmission.

DETAILED DESCRIPTION OF PREFERRED EMBODIMENTS

Figure 5:
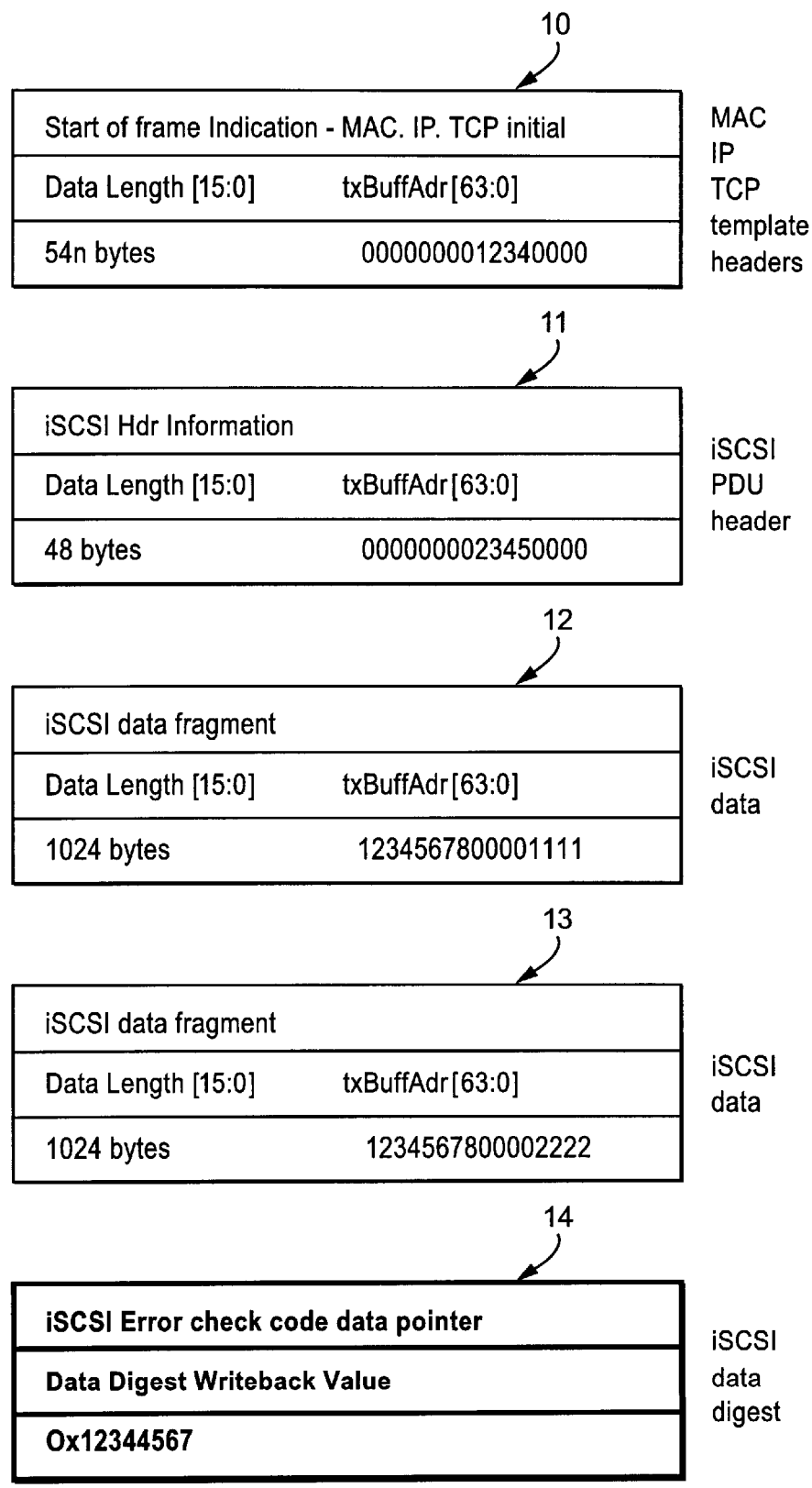
FIG. 5 is a schematic diagram of an interface that operates in accordance with the preferred embodiment of the invention.

Referring now to FIG. 1, the prior art method of generating and transmitting iSCSI error check codes for TCP transmission is shown. The data for transmission 1, is read by iSCSI function block 2 which generates the error check codes and writes them back to memory in location 3. Having done this the iSCSI functional unit instructs a TCP functional unit to forward the iSCSI data including the iSCSI error check code for transmission. The TCP functional unit then reads the data from main memory in order to proceed with the transmission. It will be appreciated that this whole process requires two reads, the first to the iSCSI functional unit and the second to the TCP functional unit.

FIG. 2 shows a system for transmitting with a single read operation. A transmit engine 5 operates according to TCP and iSCSI protocol (Protocols other than TCP and iSCSI may be substituted) The engine 5, is termed an iTCP Engine. It reads in the data 1 from memory, which in this instance is provided in a format into which the Engine 5 will insert the error check codes once they has been calculated. The Engine 5 generates, for the iSCSI protocol instance iSCSI PDUs (protocol data units) which are put into TCP PDUs for transmission over a TCP/IP network.

An iSCSI PDU may be smaller, equal to or larger than a TCP PDU (which is frequently the case). Thus in order to transmit a single iSCSI PDU, several TCP PDUs may need to be transmitted each of which carry a portion of the iSCSI PDU.

In addition to generating the iSCSI PDUs, the iTCP engine 5 also generates the iSCSI (or other protocol) error check code for each iTCP PDU and inserts it to the TCP PDU as it is transmitted. Prior to the appending of the check codes the Engine has provided a TCP data stream into which the check codes will be inserted at appropriate places by any of the various techniques known in the art.

This system has the advantage of only a single read operation. It does have a drawback in that if some of the TCP data is lost and retransmission is required, the process of reading data, recalculating and appending the error check codes has to be repeated. In some instances where loss of data is not prevalent the overhead of the recalculation may be acceptable for the benefit of the simplicity of the system.

A more preferred embodiment of the invention is shown in FIG. 3 which overcomes the problem of recalculation for retransmission.

In FIG. 3, in addition to appending the iSCSI error check codes to the transmission, the iTCP engine 5 also writes the iSCSI error check codes back into the main memory at a location indicated to the iTCP engine. Typically this can be at the end of the iSCSI data or can be another location indicated by an address pointer or a similar mechanism. With this write-back the error codes are stored and do not need a recalculation for retransmission.

In the event that, for example, TCP PDU (or segment) 4 is not received by the far end receiver, the receiver will detect that segment 4 is missing and issue a re-send request. The response to this request is illustrated in FIG. 4.

In this instance the iTCP engine will include or be connected to a TCP retransmission function. On receipt of the retransmission request the re-transmitter function in the engine points the iTCP engine at the portion of data in memory that needs to be sent. At this stage the iTCP engine does not need to know that the data represents or its originating protocol only that it is TCP data. Therefore any of the data, including the retrieved iSCSI error check code that needs re-transmission is treated as TCP data and transmitted. There is no need to read in the whole iSCSI PDU in order to regenerate the error check code.

The data for transmission is presented to the iTCP engine as a sequence of buffer descriptors which are illustrated schematically in FIG. 5. A SCSI layer application will hand SCSI based block data to the iSCSI layer for transmission. The iSCSI layer builds an iSCSI PDU header which is handed along with data buffers to the TCP layer for transmission TCP, IP and MAC headers are then built for the iSCSI data.

In FIG. 5 the SCSI data is represented by the data blocks pointed to be descriptors 11 and 12, in this example each having 1 kilobyte of data at, respectively, addresses 123456780000111 and 1234567800002222. The iSCSI header, pointed to by descriptor 11, is shown as 48 bytes long and at address 0000000023450000. At this point the iSCSI header does not yet contain the iSCSI header check code.

Descriptor 10 points to the TCP/IP and MAC (Media access control, such as Ethernet/802 3) headers at address 0000000012340000. This is 54 bytes in total 14 bytes of MAC header, 20 bytes of IP header and 20 bytes of TCP header The iTCP engine starts a transmission by reading the MAC, IP and TCP headers and reading a TCP data unit (segment) size of data from the next buffer or buffers. In the instance shown, the TCP data unit would be large enough to include the iSCSI header data from buffer descriptor 11 and some portion of the iSCSI data from buffer descriptor 12. As the ITCP engine reads the data from memory it calculates the MAC, IP, TCP and iSCSI header error check codes. Only the iSCSI error check codes may have to be reused and the iTCP engine writes the iSCSI error check code for the iSCSI header into a space in the header buffer shown as address 0000000023450000. The header error code is also inserted into the TCP data unit as it is transmitted.

The iTCP engine may send out one or more TCP data unit while it is generating one iSCSI PDU. As the iTCP engine sends out the TCP segment containing the end of the data portion of the iSCSI PDU in this instance from buffer descriptor 13, it can also generate the iSCSI data error check code and transmit that at the end of the TCP data unit. Unlike the header error check, there is not usually (or not always) a space at the end of the data buffer into which the data error check code can be written, and so another location into which it can be placed is provided. In the example shown the error check code is given as O×12344567, i e a 32 bit value, and it is written directly into a specifically provided memory space pointed to by the buffer descriptor. This error check code is then available for re-use if a TCP segment needs to be re-sent. The data error check code is not stored like any other TCP data retained for possible retransmission and simply retransmitted if required and overwritten once the acknowledge signal is received.

Figure 6:
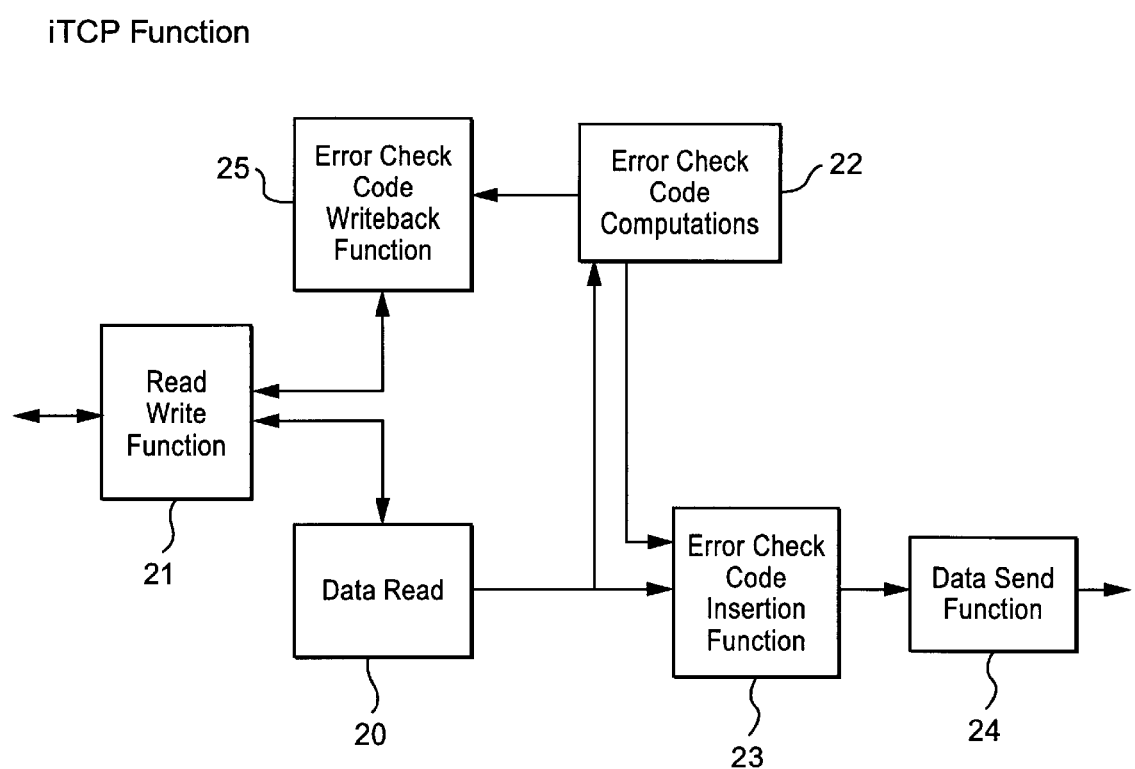
FIG. 6 is a schematic diagram of the iTCP engine of a preferred embodiment of the invention.

FIG. 6 is a functional diagram of the iTCP engine.

A data read function 20 reads in the data via read/write function 21 as provided by the buffer descriptors described in connection with FIG. 5. Error check code computations are determined (box 22) and inserted at box 23 into the TCP data stream which is then transmitted (box 24). The error check code computations are also supplied to a writeback function 25 which inserts them into the header buffer and the extra memory in the TCP retransmission function.

What is claimed is:

1. A method for transmitting upper layer data generated in an upper layer protocol in transport protocol data units, the transport data units including error check codes for said upper layer data, said method comprising:

reading said upper layer data from memory into a transmit engine that operates according to both said upper layer protocol and said transport protocol;

generating upper layer protocol data units for inclusion in transport protocol units;

providing a transport protocol data stream;

generating error check codes for the upper layer protocol data units;

inserting said error check codes and upper layer data directly into the transport protocol data stream, and transmitting said transport protocol data stream.

2. A method as in claim 1 in which said error check codes are also written back to said memory for re-use in the event of a retransmission.

3. A method as in claim 2 in which a header error check code is written back to the memory buffer that contains a header.

4. A method as in claim 2 in which a data error check code is written back into a buffer descriptor in the memory.

5. A method as in claim 1 in which the upper layer protocol is iSCSI.

6. A method as in claim 1 in which the transport protocol is TCP or SCTP.

7. A method as in claim 1 in which the error check code for a header and the error check code for data are inserted at separate location sin the transport protocol data stream.

8. A method of transmitting upper layer data generated in an upper layer protocol in transport protocol data units, the transport data units including error check codes for said upper layer data, said method comprising:

reading said upper layer data from memory into a transmit engine that operates according to both said upper layer protocol and said transport protocol;

generating upper layer protocol data units for inclusion in transport protocol units;

providing a transport protocol data stream;

generating error check codes for the upper layer protocol data units;

inserting said error check codes and upper layer data in to the transport protocol data stream without a prior writeback to and second read from memory, and transmitting said transport protocol data stream.

9. A method as in claim 8 in which the error check codes are also written back to the memory for re-use in the even to of a retransmission.

10. A method as in claim 9 in which a data error check code is written back to a memory buffer that contains a header.

11. A method as in claim 9 in which a data error check code is written back into a buffer descriptor in the memory.

12. A method as in claim 8 in which the upper layer protocol is iSCSI.

13. A method as in claim 8 in which the transport protocol is TCP or SCTP.

14. A method as in claim 8 in which an error check code for the header and an error check code for the data are inserted at separate locations in the transport protocol data stream.

15. A transmit engine for transmitting upper layer data generated in an upper layer protocol in transport protocol data units, the transport data units including error check codes for said upper layer data, the transmit engine operating according to both said upper layer protocol and said transport protocol and comprising:

means for reading the upper layer data from memory;

means for providing a transport protocol data stream;

means for generating error check codes for the upper layer data, and means for inserting the error check codes directly into transport protocol data units as they are generated.

16. A transmit engine as in claim 15 further including means for writing back error check codes to the memory.

17. A transmit engine for transmitting upper layer data generated in an upper layer protocol in transport protocol data units, the transport data units including error check codes for said upper layer data, the transmit engine operating according to both said upper layer protocol and said transport protocol and comprising:

means for reading said upper layer data from memory;

means for generating upper layer protocol data units for inclusion in transport protocol units;

means for providing a transport protocol data stream;
means for generating error check codes for upper layer protocol data units;

means for inserting said error check codes and upper layer data directly into the transport protocol data stream, and means for transmitting said transport protocol data stream.

18. A transmit engine as in claim 17 further comprising means for writing said error check codes back to memory for re-use in the event of re-transmission.

19. A transmit engine for transmitting upper layer data generated in an upper layer protocol in transport protocol data units, the transport data units including error check codes for said upper layer data, the transmit engine operating according to both said upper layer protocol and said transport protocol and comprising:

means for reading said upper layer data from memory;

means for generating upper layer protocol data units for inclusion in transport protocol units;

means for providing a transport data stream;

means for generating error check codes for the upper layer protocol data units;

means for inserting said error check codes and upper layer data into the transport protocol data stream without a prior writeback to and second read from memory, and means for transmitting said transport protocol data stream.

20. A transmit engine as in claim 19 further comprising means for writing said error check codes back to memory for re-use in the even of re-transmission.

* * * * *